(12) United States Patent
Malboeuf et al.

(10) Patent No.: US 8,852,718 B2
(45) Date of Patent: Oct. 7, 2014

(54) SPRAYABLE WASTE RUBBER-BASED COATING

(71) Applicants: Mathieu Malboeuf, Coteau-Du-Lac (CA); Dorian Braun, Pointe-Claire (CA)

(72) Inventors: Mathieu Malboeuf, Coteau-Du-Lac (CA); Dorian Braun, Pointe-Claire (CA)

( * ) Notice: Subject to any disclaimer, the term of this patent is extended or adjusted under 35 U.S.C. 154(b) by 0 days.

(21) Appl. No.: 13/768,754

(22) Filed: Feb. 15, 2013

(65) Prior Publication Data
US 2013/0158144 A1    Jun. 20, 2013

Related U.S. Application Data

(63) Continuation of application No. 13/525,467, filed on Jun. 18, 2012, now abandoned, which is a continuation of application No. 11/991,381, filed as application No. PCT/CA2006/001452 on Sep. 1, 2006, now abandoned.

(60) Provisional application No. 60/713,368, filed on Sep. 2, 2005.

(51) Int. Cl.
| | | |
|---|---|---|
| *D06N 7/04* | (2006.01) | |
| *C09D 175/04* | (2006.01) | |
| *C09D 163/00* | (2006.01) | |
| *E04D 7/00* | (2006.01) | |
| *C09D 117/00* | (2006.01) | |
| *C09D 167/00* | (2006.01) | |
| *C09D 177/00* | (2006.01) | |
| *C08L 19/00* | (2006.01) | |
| *B05B 7/32* | (2006.01) | |
| *C08L 77/00* | (2006.01) | |
| *C08L 63/00* | (2006.01) | |
| *C08L 67/00* | (2006.01) | |
| *C08K 7/02* | (2006.01) | |
| *C08L 75/00* | (2006.01) | |

(52) U.S. Cl.
CPC ............ *C09D 175/04* (2013.01); *C09D 163/00* (2013.01); *E04D 7/00* (2013.01); *B05B 7/32* (2013.01); *C09D 117/00* (2013.01); *C08L 77/00* (2013.01); *C09D 167/00* (2013.01); *C09D 177/00* (2013.01); *C08L 19/003* (2013.01); *C08L 63/00* (2013.01); *C08L 67/00* (2013.01); *C08K 7/02* (2013.01); *C08L 75/00* (2013.01)
USPC .............. 428/147; 521/40; 521/42; 521/42.5; 521/44.5; 427/331; 427/340; 427/400; 427/407.1; 525/55; 525/232; 524/503; 428/141; 428/142; 428/144

(58) Field of Classification Search
CPC .... C09D 175/05; C09D 77/00; C09D 163/00; C09D 117/00; C09D 167/00; C04D 7/00; C08L 19/003; C08L 75/00; C08L 77/00; C08L 63/00; C08L 67/00; C08K 7/02; B05B 7/32
USPC ......... 521/49, 40–44.5; 524/1, 543, 570, 502; 427/331, 340, 400, 402, 407.1, 410, 427/412.5, 413; 525/50, 55, 56, 232, 238, 525/242; 428/141, 142, 144, 147; 516/9, 516/98, 198
See application file for complete search history.

(56) References Cited

U.S. PATENT DOCUMENTS

| | | |
|---|---|---|
| 4,196,259 A | 4/1980 | Augustin et al. |
| 4,217,395 A | 8/1980 | Kuan et al. |
| 4,331,738 A | 5/1982 | Kuan |
| 4,431,689 A | 2/1984 | Gunter |
| 5,063,091 A | 11/1991 | Martorano |
| 5,258,222 A | 11/1993 | Crivelli |
| 5,488,080 A | 1/1996 | Osborn |
| 5,604,277 A | 2/1997 | Osborn |
| 5,883,182 A | 3/1999 | Hunt |
| 5,900,061 A | 5/1999 | Wright |
| 5,985,366 A | 11/1999 | Wright |
| 6,060,555 A | 5/2000 | Wright |
| 6,126,999 A | 10/2000 | Tomasino |
| 6,458,423 B1 | 10/2002 | Goodson |
| 6,783,799 B1 | 8/2004 | Goodson |

| | | | |
|---|---|---|---|
| 6,866,935 B1 | 3/2005 | Lee et al. | |
| 2001/0004649 A1 | 6/2001 | Osborn | |
| 2002/0009622 A1 | 1/2002 | Goodson | |
| 2003/0018118 A1 | 1/2003 | Burnett | |
| 2003/0204002 A1 | 10/2003 | Osborn | |
| 2006/0037815 A1 | 2/2006 | Schabel, Jr. | |
| 2006/0086836 A1 | 4/2006 | Osborn | |

FOREIGN PATENT DOCUMENTS

CA        2510002 A1    12/2005

OTHER PUBLICATIONS

Sport Tracks 200 data sheet, http://www.hellasconstruction.com/prodcuts/sporttrack200.php, May 2007, entire document.*

Seema et al, "Thermal Degradation of Short Nylon-6 Fiber-Reinforced Styrene Butadiene Rubber Composite", J. Polymeric Materials, 55:25-35, 2006.*

Allcock et al, "Contemporary Polymer Chemistry", 2003, Pearson Educaiton, Inc., Third Edition, pp. 152-154.*

Allcock et al, "Contemporary Polymer Chemistry", (2003) Pearson Education, Inc. Third Edition, pp. 51-52.

PCT/ISA/210—International Search Report in PCT/CA2006/001452, mailed Dec. 12, 2006.

PCT/ISA/237—Written Opinion of the International Searching Authority in PCT/CA2006/001452, mailed Nov. 28, 2006.

B. Adhikari et al., "Reclamation and Recycling of Waste Rubber" Prog. Polym. Sci. (2000), vol. 25, pp. 909-948.

Han Zhu et al., "Adding Crumb Rubber into Exterior Wall Materials" Waste Management and Research, (2002) vol. 20, pp. 407-413.

* cited by examiner

*Primary Examiner* — Frances Tischler (74) *Attorney, Agent, or Firm* — Buchanan Ingersoll & Rooney P.C.

(57) ABSTRACT

Surface coating composition, method and apparatus for coating a surface. The surface coating composition comprises a recycled rubber product, one or more binding agent and optionally one or more additional agent.

12 Claims, 1 Drawing Sheet

SPRAYABLE WASTE RUBBER-BASED COATING

CROSS-REFERENCE TO RELATED APPLICATIONS

This application is a continuation of application Ser. No. 13/525,467, filed Jun. 18, 2012, which is a continuation of application Ser. No. 11/991,381, filed Apr. 1, 2009, which is a National Stage of Application No. PCT/CA2006/001452, filed Sep. 1, 2006, which claims the benefit of U.S. Provisional Application No. 60/713,368, filed Sep. 2, 2005. The entire contents of each of application Ser. No. 13/525,467, U.S. application Ser. No. 11/991,381, Application No. PCT/CA2006/001452 and Application No. 60/713,368 are hereby incorporated herein by reference in their entirety.

FIELD OF THE INVENTION

The invention generally relates to surface coating composition, method and apparatus for coating a surface.

BACKGROUND OF THE INVENTION

Up to now, existing roofing systems are very labor dependent and require multiple steps.

Existing roofing materials are primarily bituminous based asphaltic substances, and have inherent limitation in their abilities to perform well and over time when exposed to weathering conditions such as U.V exposure, wind, precipitation, temperature extremes and physical shocks.

Contamination problems arise with the use of traditional bituminous based roofing systems, where equipment and clothing eventually are covered with tar. Substantial costs and labor is required in maintenance and replacement of the said equipment. Additionally, traditional bituminous based systems require significant labor and machinery to lift materials to the roof surface. Installation and removal of such system also require significant labor.

Furthermore, traditional roofing systems apply materials at elevated temperature (typically between 450° C.-900° C.) and results in injury, fire and worker safety issues. Significant amount of Volatile Organic Compound (V.O.C) are present in traditional systems which are environmental and health issues.

Traditional roofing systems, when exposed to hot weather conditions, are prone to heat degradation and tearing. They may also stick to worker's footwear or equipment thus rendering roof servicing inconvenient. Furthermore, asphaltic substances are directly affected by the price of world oil commodities Typical membrane-based roofing products exhibit "wind lift" drawbacks due to the fact that their point of adhesion to the substrate are limited.

Newer materials based on Ethylene Propylene Diene Monomer (E.P.D.M) membranes involve welding of joints which can cause fires. The placement of sheets is laborious. They are also prone to tearing and perforation as the thickness is typically 3 mm or less. The sheets can be auto-adhesive or not but still in most cases, require welding of the joint.

Other systems include spray systems which are E.P.D.M, polyvinyl. chloride (P.V.C) and asphaltic based, and are sometimes rubber modified and can be cold applied in thin layers. These systems are subject to abrasion, puncture, and thermal cracking caused by tension and compression.

Recent polymeric sheet membranes (E.P.D.M, P.V.C, bituminous modified and other) are complex to apply, and require many joints which are leak prone and subject to failure when tensile forces result from thermal expansion and contraction.

Roofing systems employing shingles all suffer from leakage due to "wind lift", curling and water back-up. Shingles are nailed and nail holes provide water entry. Shingles are a non-continuous barrier. Shingles can be made of asphalt, cedar, clay, aluminum, asbestos, cement and compositions thereof.

There is therefore a great need to provide an improved coating composition as well as apparatus and method for applying said composition.

SUMMARY OF THE INVENTION

In one aspect, there is provided a surface coating composition comprising a recycled rubber product and one or more binding agent.

In one aspect, there is also provided a method for coating a surface comprising i) providing a coatable surface; ii) mixing a recycled rubber product, one or more binding agent and optionally one or more additional agent, so as to produce a coating composition; and iii) applying the composition to said surface.

In a further aspect, there is also provided an apparatus for applying a coating composition to a surface comprising: an input for delivering a recycled rubber product, one or more binding agents and optionally one or more additional agents; a container associated to the input for receiving said recycled rubber product, said one or more binding agent and said one or more optional additional agents; conveying means associated to the container for conveying the coating composition from said container to said surface; and optionally, mixing means associated to the container for mixing said recycled rubber product, said one or more binding agent and said additional agents.

In a further aspect, there is also provided a roof coating composite resulting from the curing of the coating composition as defined herein.

BRIEF DESCRIPTION OF THE FIGURES

Having thus generally described the nature of the invention, reference will now be made to the accompanying drawings, showing by way of illustration a preferred embodiment thereof, and in which.

DETAILED DESCRIPTION OF THE INVENTION

The features that characterize the invention, as to composition, method of using said composition and apparatus for applying said composition, together with further objects and advantages thereof, will be better understood from the following description used in conjunction with the accompanying drawing.

In accordance with the present invention, there is provided a surface coating composition comprising a recycled rubber product and one or more binding agents.

One suitable recycled rubber product is reclaimed tire processing products (RTPP). As such what is meant by "reclaimed tire processing products" is the products derived from the processing of reclaimed tire, taken each individually or in any combination, such as crumb rubber particles of all sizes (e.g. from about 3 microns to about ½ inch), buffings as they are known in the art (e.g. comprised of powder cuttings and shavings), strands of varying dimensions, generally cylindrical in nature and shape, (e.g. with dimensions ranging from about ¼ mm to about 1 cm diameter and about 1 mm to about 10 cm in length), bands of generally flat and elongated shape (e.g. with dimensions ranging from about ¼ mm to about 1 cm thickness, from about ¼ mm to about 1 cm width and from about 1 mm to about 20 cm length).

Reclaimed tire processing products may contain various polymers such as Styrene Butadiene Rubber (SBR), Styrene Butadiene Styrene (SBS) and E.P.D.M. Butyl components can also be used in the present invention. The term "Butyl" refers to the part of the tire that is non-air permeable and that is rarely used in traditional recycling processes due to its difficulty to be de-vulcanized and/or re-polymerized. Additionally, "reclaimed tire processing products" may comprise fibers such as of polyester, nylon or Kevlar.

Typical examples of components that may be found in Reclaimed tire processing products that can be used in the present invention are as follow:

Passenger Car Tire

| | |
|---|---|
| Natural rubber | 14% |
| Synthetic rubber | 27% |
| Carbon black | 28% |
| Steel | 14-15% |
| Fabric, fillers, accelerators, antiozonants, etc. | 16-17% |

Average weight: New tire 25 lbs, Scrap tire 20 lbs.

Truck Tire

| | |
|---|---|
| Natural rubber | 27% |
| Synthetic rubber | 14% |
| Carbon black | 28% |
| Steel | 14-15% |
| Fabric, fillers, accelerators, antiozonants, etc. | 16-17% |

Average weight: New tire 120 lbs., Scrap tire 100 lbs.

Reclaimed tire processing products provides advantageous mechanical properties to the coating composition and thicker surface coating at relatively low cost.

As will also be appreciated, reclaimed tire processing products used in the coating composition of the present invention, is obtained from whole tire processing. The composition therefore has the potential for utilizing significant quantities of reclaimed tires. Furthermore, a skilled person will understand that it is possible to pre-treat the reclaimed tire processing products with any kind of chemical agent or reagent used in a preliminary step before the introduction of the (binding agent). Mechanical pre-treatment processes include abrasion and cutting or chemical process that can enhance the surface.

Preferably, recycled rubber product is reclaimed tire processing 10-20 crumb and buffings (fine crumb). The difference between the two is the size of the final product. Buffings is what is commonly referred to in the industry as tire retread waste which is typically very fine powder. The term also seems to apply for any size above 90 mesh. 10-20 is a standard sifter size which is labeled as a crumb mesh size which is commonly used in many applications due to its usable and relatively uniform size.

The exact crumb rubber/binder ratio may be determined according to the application and commercial availability of rubber crumb.

Preferably, the coating composition is comprised of 60%-80% by weight of recycled rubber product.

More preferably, the coating composition is comprised of 66%-72% by weight of recycled rubber product.

Preferably the crumb rubber particles are primarily spherical and spheroid particles in the 1-5 mm range.

Preferably, about 80% of the total crumb weight is crumb rubber particles in the 1-3 mm range.

Particles of a smaller dimension (powder) will be added to fill interstitial spaces between the 1-3 mm particles. These particles are between 20-90 mesh size. The particles will reduce binder content.

Fibers from tires are comprised of polyester, nylon and Kevlar polymers. These fibers may be included in the formulation up to 3% by weight of the composition. Fiber content will modulate the tensile properties and thixotropism.

As used herein, the term "binding agent" is meant to include any agent suitable to bind together with the surface to be coated as well as the recycled rubber product to form an adherent composite material. Suitable binding agents include, without limitation, polyurethane-, polyacrylate-, epoxy-based binding agents and their mixtures thereof. Catalysts (or hardener or curing agents) may need to be added to a starting resin or polymer to achieve the desired binding activity. Binder type shall be dependent on application surface to be coated such as temperature ranges to withstand, surface adhesion, chemical exposure, ultra-violet exposure and flexibility criteria.

The resin-hardener mix ratio may be varied. Changing the ratio of hardener and catalyst in an epoxy mix for example can modify the properties of the final cured product. As such varying amounts of epoxy catalyst and resin can be used depending of the desired final result. In one embodiment, the resin-hardener ratio is from about 2:1 to 1:2.

In one embodiment, the binding agent is polyurethane-based binding agent.

In a further embodiment, the binding agent is polyacrylate-based binding agent.

In still a further embodiment, the binding agent is epoxy-based binding agent.

In still a further embodiment, the binding agent comprises an epoxy-based binding agent and a polyurethane-based binding agent.

In a further embodiment, the amount of polyurethane-based binding agent in composition comprising an epoxy-based binding agent and a polyurethane-based binding agent is about 20% by weight or less.

Non-limiting examples of suitable epoxy resin include diglycidyl ether of bisphenol A (DGEBA), diglycidyl ether of bisphenol B (DGEBB) and diglycidyl ether of bisphenol F (Novolac®). Preferably, the epoxy resin used in the present invention for roofing applications is DGEBA. Other epoxy resins (specifically BIS F and Novolac®) can advantageously be used in applications other than roofing.

Epoxy catalysts (or hardener or curing agent) suitable for use to cause the epoxy curing include aliphatic, cycloaliphatic amides, polyamides, amines, polyamines. Curing agents are generally based upon amines or amides. The catalyst can be a blend of curing agents selected due to properties and/or price. The addition of cycloaliphatic curatives in the curing agents of epoxy resin systems greatly improves the epoxy. Traditional aliphatic polyamines are diethylenetriamine, triethylenetetramine. It will be recognized that there are an immense number of commercial hardeners (or curing agents) available, which have various trade names (e.g. ARADUR 955-1).

Polyurethane binding agents suitable for use in the present invention include without limitation, one part polyurethane such as, moisture cured or two part polyurethane for which the second part is a curing agents/catalyst including Isocyanates aliphatic and aromatic such as diphenylmethane diisocynate (MDI), tolulene diisocynate (TDI), hexamethalene diisocynate (HDI), naphthalene diisocynate (NDI).

Polyurethane products are often called "urethanes". They should not be confused with the specific substance urethane, also known as ethyl carbamate. Polyurethanes are not produced from ethyl carbamate, nor do they contain it. The main polyurethane producing reaction is between its precursors that are polyisocyanate, generally a diisocyanate, aromatic and aliphatic types are available such as diphenylmethanediisocyanate or toluene 2,4-diisocyanate, and a polyol, typically a polyethylene glycol or polyester polyol, glycerol or ethylene glycol, in the presence of catalysts (e.g. diazobicyclo[2.2.2]octane) and if needed materials for controlling the cell structure, Polyurethane can be made in a variety of densities and hardnesses by varying the type of monomer(s) used and adding other substances to modify their characteristics, notably density, or enhance their performance. It will be appreciated that the catalysis can be made through the addition of a catalyst when mixed, or be "air driven", which refers to using the ambient air moisture (humidity). Preferably, the catalysis reaction is catalyst driven A polyurethane is made by mixing together the ingredient chemicals (e.g. isocyanate and polyol) in predetermined proportions, which then react to form the polymer.

Uniquely, polyurethane utilizes simultaneous polymerization and shaping of the part.

The production of consistent end products depends on mixing, in precise ratio, the ingredient chemicals and maintenance of the appropriate processing temperatures. As the liquid isocyanate and polyol react to form the polyurethane, the liquid mix becomes increasingly viscous eventually forming a solid mass. The reaction is exothermic and therefore heat is involved.

The isocyanate compounds include isocyanate compounds having at least two-isocyanate groups, such as aromatic diisocyanates and aliphatic diisocyanates, including m- and p-phenylene diisocyanate, p,p'-diphenyl diisocyanate. Other products which are usable are diphenyl methane-4,4'-diisocyanate, tetra-, penta-, hexa-, hepta-, and octa-methylene diisocyanate, cyclohexylene diisocyanate, 2,4-tolylene diisocyanate, 2,6-tolylene diisocyanate, polymethylene polyphenyl isocyanates, and mixtures thereof. The preferred isocyanates and mixtures will be those which are liquid at or near room temperature, thus facilitating mixing and forming a pourable liquid resin composition.

Other ingredients may be included in the polyurethane curing catalyst (e.g. polyol blend).

Acrylate binding agents suitable for use in the present invention include without limitation one part and two part acrylate such as polyacrylate, polymethacrylate, acrylic latex, dimethylamino ethyl acrylate, diethlamino ethyl acrylate, thiodigylcol diacrylates and methacrylate.

A typical binding agent used in a more universal application is "bisphenol A" with amine or amide hardener.

The binding agents used in accordance with compositions of the present invention are non-aqueous based and catalyzed. The deliberate addition of water to the composition during preparation or use of water cured binding agents in the composition would have a negative or deleterious effect on the resulting composition and/or roof coating composite. The compositions can however withstand the ambient air moisture or a minor amounts of water during the application phase, for example if it was to start raining on an uncured product. It is however contemplated that water could be sprayed on top of an applied coating to accelerate the cure rate of a urethane based or urethane containing binder composition.

An added reactive agent called a "viscosity modifier" can be used in small quantities to adjust viscosity characteristics to assist in the positive displacement of the material (such as pumping). The viscosity modifier or diluents is of the aliphatic glycidyl ether type.

Typical example of epoxy resin formulation include without limitation Araldite GY 506® (bisphenol A modified with butyl glycidyl ether), Aradur 955-1® (polyamidoamine hardener) and Araldite DY-E® (aliphatic glycidyl ether).

In one embodiment, the coating composition comprises about 10% to 90% by weight of the recycled rubber product and about 90% to 10% by weight of the binding agent.

In a further embodiment, the coating composition is comprising about 55% to 75% by weight of the recycled rubber product and about 45% to 25% by weight of the binding agent.

In a further embodiment, the coating composition is comprising about 60% to 80% by weight of the recycled rubber product and about 40% to 20% by weight of the binding agent.

It will be understood that the total amount of all components of the final composition is defined as 100%. The total of the higher or lower % value in the % amount ranges may be equal to or lower than 100% as it may comprise additional agents.

In accordance with the present invention, in one embodiment, the composition further comprise an additional agent selected from viscosity modifier, coal tar, foaming agents, fire retardants, coloring agents, fungicides and their mixture thereof.

As used herein, the term "viscosity modifier" means any additive that can modify the composition viscosity to a desired viscosity level (either higher or lower). Typical example include, without limitation solvents, lubricants and gelling agents. The viscosity modifier component can comprise one or more viscosity modifier.

In further embodiments:
the viscosity modifier is solvents;
the viscosity modifier is lubricants; and
the viscosity modifier is gelling agents.

Solvent suitable for use in the present invention include without limitation one or more of acetone, xylene, methyl ethyl ketone, lacquer thinner.

A viscosity modifier is an additive which prevents crosslinking and polymerization of the epoxy and hardener. The result is flexibility and "toughness". The viscosity modifier does not evaporate with time so that the epoxy material won't become brittle.

Preferably, the viscosity modifier is a heavy oil. Heavy oil is a high molecular weight petroleum derivative which is low in cost. It can act as a non-reactive diluent. It is not volatile and does not evaporate from the epoxy. The high-boiling, relatively viscous fractions of petroleum or coal tar oils are considered heavy oils.

Preferably the viscosity modifier is a monofunctional Glycidyl Ethers (GE). Monofunctional GE refers to a non-reactive agent which won't add to the polymerization. In order to have polymerization a molecule must be bi-functional or tri-functional and be able to attach to others around it. A mono-functional can attach itself and not hold any other molecule.

In one embodiment, the viscosity modifier comprises a heavy oil, Monofunctional GE and their mixtures thereof.

In accordance with the present invention, in one embodiment, the composition further comprises an additional agent that is coal tar. Coal tar is a viscous black liquid containing numerous organic compounds (generally comprising polycyclic aromatic hydrocarbons and their methyl and polymethyl derivatives, as well as heteronuclear compounds) that is obtained by the destructive distillation of coal and used as a roofing, waterproofing, and insulating compound and as a raw material for many dyes, drugs, and paints. Coal tar addition will alter end viscosity but the desired effect is to modify the final characteristics of the solid reacted epoxy.

Foaming agents suitable for use in the present invention may be of various nature and include: chemical agent which introduces gas bubbles into mixture creating foam or effervescence with the end result of trapping air into the coating which creates and modify the "R" value (insulation value). Alternatively, gas bubbles may be introduced by mechanical agitation which can be achieved using known techniques to the skilled person in the art.

Fire retardants are used to decrease ignition rates of binding agents. The additives do modify mechanical properties very slightly and are used in very small proportions (<2% typically). Fire retardants suitable for use in the present invention may be of various nature and include:

ammonium polyphosphate

Tetrabromobisphenol A (TBBPA)

BEP-2: brominated epoxy polymeric flame retardant designed for a broad range of thermoplastic applications.

Coloring Agents are used to alter color. As used in the present invention, the surface coloring agent is optionally applied as a second coat. If applied in this fashion, it is not added directly to the composition.

Fungicide: is added to prevent bacterial growth. The composite itself does not support bacterial growth; however added organic material (dirt, leaves, and bird waste) will initiate growth. The fungicide is optionally applied as a second coat with or without the colorant.

Lubricants suitable for use in the present invention include without limitation oils such as aromatic oils, paraffinic oil.

In one embodiment, the coating composition is comprising about 1% to 90% by weight of the recycled rubber product, about 1% to 90% by weight of the binding agent and about 1% to 10% by weight of the additional agent.

In one embodiment, the coating composition is comprising about 50% to 80% by weight of the recycled rubber product, about 50% to 20% by weight of the binding agent and 0% to about 30% of the additional agent.

A person of ordinary skill will also readily understand that it is possible to add various certain chemicals to enhance or modify characteristics of the composition such as fire resistance ability, resistance to acid or alkali exposure, modifiers to improve characteristics such as tensile strength, flexibility, fracture mechanics, brittleness, ductility, toughness, or any other characteristic that could be desirable in the art.

The coating composition of the present invention can be used in a number of applications. Without being limited, the composition may be applied to a variety of surfaces such as building roofs, roads and walls.

For use in roof coating, the coating composition may be applied to surfaces consisting of asphalt, wood, concrete as well as tar and/or gravel and most of the inorganic substances (such as metals) and insulation materials (such as extruded/expanded polystyrene, ten test and the like).

The composite resulting from the curing of the coating composition of the present invention provides unique physical and mechanical properties that are in clear contrast with previously reported thermal membranes. The properties are totally different than an insulating material. Once applied, the coating composition of the present invention provides composites with unique properties, as described in the examples, with regards to water penetration, crack bridging, elongation, cold temperature bend test and other elastomeric tests. Previously reported thermal insulation material would not withstand or duplicate the results obtained from the present invention.

For use in road surfacing or re-surfacing, the coating composition may be applied to surfaces consisting of asphalt, concrete, sand, crushed stones or earth.

For use in wall coating the coating composition may be applied to surfaces consisting of gypsum, wood or concrete, asphalt rock or the like as well as acoustic or thermal insulation components.

In accordance with the present invention, there is provided, in one embodiment, a method for coating a surface comprising i) providing a coatable surface; ii) mixing a recycled rubber product, one or more binding agents and optionally one or more additional agents selected from viscosity modifier, coal tar, foaming agents, fire retardants, coloring agents, fungicides and their mixture thereof., so as to produce a coating composition; and iii) applying the composition to said surface.

In one embodiment, the method of the invention is further comprising a step of iv) applying a surface protective material selected from anti-UV agent, anti-slip agent, bactericide agent and their mixture thereof.

In one embodiment, the anti-UV agent is silica or titanium dioxide.

In one further embodiment, the anti-slip agent is silica, sand or crushed stones.

In a further embodiment, the anti-UV agent and the anti-slip agent are silica.

The use of silica on top of the coating composition will provide substantial U.V protection, as well as reflection of light. The coated surface will therefore remain cooler, stock less heat and therefore reducing the burden on industrial, commercial, and residential buildings requiring thermal control. The silica will also provide good slip resistance for foot traffic to the coated surface.

The anti-UV agent and anti-slip agent shall be firmly secured to the composite layer by using an anti-UV agent binder or anti-slip agent binder. Such binder may be same or different from the binding agent used in the coating composition. However, when the binder used is different, it should not cause a deleterious effect to the coating composition already in place. Alternatively, the anti-UV agent and/or anti-slip agent may be applied immediately after application of the coating composition and before the composition has cured such that it will be bound with the coating composition.

When a binder is used to apply the –UV agent and/or anti-slip agent, the binder is in a weight ratio of about 1% to 90% and about 99% to 10% anti-UV agent and/or anti-slip agent. Preferably the binder is used in a weight ratio of about 5% to 25% and about 95% to 75% anti-UV agent and/or anti-slip agent.

It will be clear to a skilled person that depending on the needs, the anti-slip agent and/or the anti-UV agent, which are disposed on top of the coating composition, may also fulfill esthetical needs and as such the color and size of such agents may be adapted. For example, the crushed stones may be of various color and size.

The application step of the composition may be any well-known method in the art and must be suitable for conveying a workable mass of the composition and spreading the composition into a coating having a desired thickness. Without being limited, it may be applied by spray, brushes, trowel, squeegee, rake or the like. Preferably the application is conducted by spraying using air or airless sprayers.

Conventional spray apparatus are not practical for applying the composition of the present invention and as such the use of an apparatus as defined herein or a functional equivalent is required.

In accordance with the method of the invention, the coating will typically provide resistance to puncture from boots and light traffic. As such, a surface thickness of from about 1/16 inch to about 4 inches may be provided. Preferably a thickness of from about 1/8 inch to about 1 inch is provided, more preferably, a thickness of from about 1/4 inch to about 1/2 inch is suitable. The thickness of coating composition to be applied is not particularly limited and can be applied up to 1 ft if necessary. However, the skilled person will readily understand that curing time is directly affected by the amount (thickness) of coating composition applied.

The cure time with a catalyzed epoxy may be somewhat independent of time, whereas "air driven" products will be time dependent for cure as thickness increases.

The present invention will be more readily understood by referring to the following examples which are given to illustrate the invention rather than to limit its scope.

Example 1

Coal tar-Epoxy Composition

The coating composition described in table 1, below was prepared in accordance with the following protocol:

The 10-20 crumbs was mixed in proportion with buffings (90) and mixed mechanically until mixture was uniform. The approximate time required was about 2 minutes.

The coal tar derivative was added to the DGEBA resin in proportion and mixed till uniform. The approximate time required was about 2 minutes.

The Hardener was added to DGEBA resin and coal tar and thoroughly mixed by mechanical stirring until total distribution. The approximate time required was about 3 minutes.

The rubber mixture was added to the mixture of hardener DGEBA resin and coal tar while agitating, until mixture uniform. The approximate time required was about 3 minutes.

The mixture was applied within 10 minutes.

The % amount of each component in table 1 as well as the other examples below represent weight % on the basis of the total composition weight.

The epoxy resin used in tables 1 to 8 is sold under the trade name SEALREZ 943A, the hardener is sold under the trade name SEALREZ 943B. The diluent (monofunctional GE) is sold under the trade name SEALREZ 943C.

Example 2

Heavy Oil-Monofunctional GE-Epoxy Composition

The coating composition described in tables 2 to 4, below were prepared in a similar manner as for example 1, except that the heavy oil and monofunctional GE were added in place of coal tar derivative.

Example 3

Epoxy Composition

The coating composition described in tables 5 and 6, below were prepared in a similar manner as for example 1, except that the step of coal tar addition to the DGEBA resin and accompanying mixing was absent.

Example 4

Epoxy-Urethane Hybrid Composition

The coating composition described in tables 7 and 8, below were prepared in a similar manner as for example 1, except that the polyurethane precursors were added in place of coal tar derivative. The polymeric diol in tables 7 and 8 were glycerol or ethylene glycol. The polyisocyanate were diphenylmethanediisocyanate or toluene 2,4-diisocyanate. The polymerizing agent was diazobicyclo[2.2.2]octane.

TABLE 1

| Components | % | Characteristic Property | Units | Requirements (for a pass) | Observation |
|---|---|---|---|---|---|
| Coal-tar slag | 10 | Dimensional Stability | % | ≤5 | stable low water absorption |
| Hardener (epoxy) | 15 | Water Absorption | % | ≤3 | low water absorption |
| DGEBA resin | 15 | Adhesion-in-Peel | N/m | ≥175 | very good adhesion |
| 10-20 crumb | 40 | Crack Bridging | no units | no evidence of cracking | very flexible - no cracking 1" bend |
| buffings (fine crumb) | 20 | Low-Temperature Flexibility | no units | no evidence of cracking | surface cracks - 1" bend 1 sec |
| COAL TAR | | Sag-Flow Characteristic | no units | no sagging while wet | stable-viscosity dependent |
| FORMULATION 60/40 | | Pot Life (Quickset - set-up time) | Hrs | no sagging | set above 4 hrs |
| | | Static Puncture | N | 4 out of 5 samples ≥150 | all above - crumb very resistant |
| | | Dynamic Impact | J | 20 out of 24 samples ≥9 | all above - crumb absorbs energy well |
| | | Water Tightness | no units | no evidence of leaking | dry |
| | | Abrasion Resistance | mg | ≤400 | good-friction high due to rubber |
| | | Tensile-Tear Strength | N | ≥400 | after 7 day cure |
| | | Normalized Strain Energy | kN/m | ≥5.5 at 23° C. +/− 2° C. | 14 day cure |
| | | Weathering Resistance | no units | no deterioration | UV stable |
| | | Elongation Recovery | % | ≥90 average | passed |
| | | Heat Aging | years | no evidence of cracking | crumb stable |
| | | Chemical Resistance | no units | no obvious break-up | water light solvent stable |
| | | Tensile Retention | % | ≤70 average | ok |
| | | Wet Freeze-Thaw Resistance | no units | no deleterious effects | ok |
| | | Water Vapor Permeance | ng/Pa * s * m2 | report value | minimal |
| | | Pin Holing | no units | no more than one pinhole | none continuous barrier |
| TOTAL: | 100 | Loss of Volatile (V.O.C) | % | report value | minimal - no VOC epoxy or crumb |

TABLE 2

| Components | % | Characteristic Property | Units | Requirements (for a pass) | Observation |
| --- | --- | --- | --- | --- | --- |
| heavy oil | 20 | Dimensional Stability | % | ≤5 | stable low water absorption |
| Hardener (epoxy) | 15 | Water Absorption | % | ≤3 | low water absorption |
| DGEBA resin | 7.5 | Adhesion-in-Peel | N/m | ≥175 | good adhesion |
| 10-20 crumb | 30 | Crack Bridging | no units | no evidence of cracking | very flexible - no cracking 1" bend |
| buffings (fine crumb) | 20 | Low-Temperature Flexibility | no units | no evidence of cracking | 1" bend 1 sec |
| monofunctional GE | 7.5 | Sag-Flow Characteristic | no units | no sagging while wet | stable - viscosity dependent |
| HEAVY OIL | | Pot Life (Quickset - set-up time) | Hrs | no sagging | set above 4 hrs |
| FORMULATION 50/50 | | Static Puncture | N | 4 out of 5 samples ≥150 | all above - crumb very resistant |
| | | Dynamic Impact | J | 20 out of 24 samples ≥9 | all above - crumb absorbs energy well |
| | | Water Tightness | no units | no evidence of leaking | dry |
| | | Abrasion Resistance | mg | ≤400 | good - friction high due to rubber |
| | | Tensile-Tear Strength | N | ≥400 | after 14 day cure |
| | | Normalized Strain Energy | kN/m | ≥5.5 at 23° C. +/− 2° C. | 14 day cure |
| | | Weathering Resistance | no units | no deterioration | UV stable |
| | | Elongation Recovery | % | ≥90 average | passed |
| | | Heat Aging | years | no evidence of cracking | crumb stable |
| | | Chemical Resistance | no units | no obvious break-up | water light solvent stable |
| | | Tensile Retention | % | ≤70 average | ok |
| | | Wet Freeze-Thaw Resistance | no units | no deleterious effects | ok |
| | | Water Vapor Permeance | ng/Pa * s * m2 | report value | minimal |
| | | Pin Holing | no units | no more than one pinhole | none continuous barrier |
| TOTAL: | 100 | Loss of Volatile (V.O.C) | % | report value | minimal - no VOC epoxy or crumb |

TABLE 3

| Components | % | Characteristic Property | Units | Requirements (for a pass) | Observation |
| --- | --- | --- | --- | --- | --- |
| heavy oil | 10 | Dimensional Stability | % | ≤5 | stable low water absorption |
| Hardener (epoxy) | 20 | Water Absorption | % | ≤3 | low water absorption |
| DGEBA resin | 10 | Adhesion-in-Peel | N/m | ≥175 | good adhesion |
| 10-20 crumb | 40 | Crack Bridging | no units | no evidence of cracking | very flexible - no cracking 1" bend |
| buffings (fine crumb) | 10 | Low-Temperature Flexibility | no units | no evidence of cracking | 1" bend 1 sec |
| monofunctional GE | 10 | Sag-Flow Characteristic | no units | no sagging while wet | stable-viscosity dependent |
| HEAVY | | Pot Life (Quickset - set-up time) | Hrs | no sagging | set above 4 hrs |
| OIL FORMULATION 50/50 | | Static Puncture | N | 4 out of 5 samples ≥150 | softer due to high diluent |
| | | Dynamic Impact | J | 20 out of 24 samples ≥9 | reduced due to diluent |
| | | Water Tightness | no units | no evidence of leaking | dry |
| | | Abrasion Resistance | mg | ≤400 | good-friction high due to rubber |
| | | Tensile-Tear Strength | N | ≥400 | after 14 day cure |
| | | Normalized Strain Energy | kN/m | ≥5.5 at 23° C. +/− 2° C. | 14 day cure |
| | | Weathering Resistance | no units | no deterioration | UV stable |
| | | Elongation Recovery | % | ≥90 average | passed |
| | | Heat Aging | years | no evidence of cracking | crumb stable |
| | | Chemical Resistance | no units | no obvious break-up | water light solvent stable |
| | | Tensile Retention | % | ≤70 average | ok |
| | | Wet Freeze-Thaw Resistance | no units | no deleterious effects | ok |
| | | Water Vapor Permeance | ng/Pa * s * m2 | report value | minimal |
| | | Pin Holing | no units | no more than one pinhole | none continuous barrier |
| TOTAL: | 100 | Loss of Volatile (V.O.C) | % | report value | minimal - no VOC epoxy or crumb |

TABLE 4

| Components | % | Characteristic Property | Units | Requirements (for a pass) | Observation |
| --- | --- | --- | --- | --- | --- |
| Hardener (epoxy) | 20 | Dimensional Stability | % | ≤5 | stable low water absorption |
| DGEBA resin | 15 | Water Absorption | % | ≤3 | low water absorption |
| 10-20 crumb | 45 | Adhesion-in-Peel | N/m | ≥175 | very good adhesion |
| buffings (fine crumb) | 15 | Crack Bridging | no units | no evidence of cracking | needs higher flex |
| monofunctional GE | 5 | Low-Temperature Flexibility | no units | no evidence of cracking | slightly too stiff |
| EPOXY-CRUMB | | Sag-Flow Characteristic | no units | no sagging while wet | stable |
| FORMULATION 60/40 | | Pot Life (Quickset - set-up time) | Hrs | no sagging | set above 4 hrs |
| | | Static Puncture | N | 4 out of 5 samples ≥150 | good |
| | | Dynamic Impact | J | 20 out of 24 samples ≥9 | good |
| | | Water Tightness | no units | no evidence of leaking | dry |
| | | Abrasion Resistance | mg | ≤400 | good - friction high due to rubber |
| | | Tensile-Tear Strength | N | ≥400 | after 14 day cure |
| | | Normalized Strain Energy | kN/m | ≥5.5 at 23° C. +/− 2° C. | 7 day cure |
| | | Weathering Resistance | no units | no deterioration | UV stable |
| | | Elongation Recovery | % | ≥90 average | passed |
| | | Heat Aging | years | no evidence of cracking | crumb stable |
| | | Chemical Resistance | no units | no obvious break-up | water light solvent stable |

TABLE 4-continued

| Components | % | Characteristic Property | Units | Requirements (for a pass) | Observation |
|---|---|---|---|---|---|
| | | Tensile Retention | % | ≤70 average | ok |
| | | Wet Freeze-Thaw Resistance | no units | no deleterious effects | ok |
| | | Water Vapor Permeance | ng/Pa * s * m2 | report value | minimal |
| | | Pin Holing | no units | no more than one pinhole | none continuous barrier |
| TOTAL: | 100 | Loss of Volatile (V.O.C) | % | report value | minimal - no VOC epoxy or crumb |

TABLE 5

| Components | % | Characteristic Property | Units | Requirements (for a pass) | Observation |
|---|---|---|---|---|---|
| Hardener (epoxy) | 20 | Dimensional Stability | % | ≤5 | stable low water absorption |
| DGEBA resin | 20 | Water Absorption | % | ≤3 | very low water absorption |
| 10-20 crumb | 45 | Adhesion-in-Peel | N/m | ≥175 | excellent adhesion |
| buffings (fine crumb) | 15 | Crack Bridging | no units | no evidence of cracking | too stiff |
| EPOXY-CRUMB | | Low-Temperature Flexibility | no units | no evidence of cracking | resists and fractures |
| FORMULATION | | Sag-Flow Characteristic | no units | no sagging while wet | stable |
| 60/40 | | Pot Life (Quickset - set-up time) | Hrs | no sagging | set above 4 hrs |
| | | Static Puncture | N | 4 out of 5 samples ≥150 | very good |
| | | Dynamic Impact | J | 20 out of 24 samples ≥9 | excellent |
| | | Water Tightness | no units | no evidence of leaking | dry |
| | | Abrasion Resistance | mg | ≤400 | very good |
| | | Tensile-Tear Strength | N | ≥400 | after 48 hr cure |
| | | Normalized Strain Energy | kN/m | ≥5.5 at 23° C. +/− 2° C. | 2 day cure |
| | | Weathering Resistance | no units | no deterioration | UV stable |
| | | Elongation Recovery | % | ≥90 average | flex too low |
| | | Heat Aging | years | no evidence of cracking | stable |
| | | Chemical Resistance | no units | no obvious break-up | water light solvent stable |
| | | Tensile Retention | % | ≤70 average | ok |
| | | Wet Freeze-Thaw Resistance | no units | no deleterious effects | ok |
| | | Water Vapor Permeance | ng/Pa * s * m2 | report value | minimal |
| | | Pin Holing | no units | no more than one pinhole | none continuous barrier |
| TOTAL: | 100 | Loss of Volatile (V.O.C) | % | report value | no VOC epoxy or crumb |

TABLE 6

| Components | % | Characteristic Property | Units | Requirements (for a pass) | Observation |
|---|---|---|---|---|---|
| Hardener (epoxy) | 10 | Dimensional Stability | % | ≤5 | some water absorption |
| DGEBA resin | 10 | Water Absorption | % | ≤3 | water absorption high |
| 10-20 crumb | 70 | Adhesion-in-Peel | N/m | ≥175 | good adhesion |
| buffings (fine crumb) | 10 | Crack Bridging | no units | no evidence of cracking | product tears |
| EPOXY-CRUMB | | Low-Temperature Flexibility | no units | no evidence of cracking | resists and fractures |
| FORMULATION | | Sag-Flow Characteristic | no units | no sagging while wet | stable |
| 80/20 | | Pot Life (Quickset - set-up time) | Hrs | no sagging | set above 4 hrs |
| | | Static Puncture | N | 4 out of 5 samples ≥150 | very good |
| | | Dynamic Impact | J | 20 out of 24 samples ≥9 | good |
| | | Water Tightness | no units | no evidence of leaking | some penetration |
| | | Abrasion Resistance | mg | ≤400 | very good |
| | | Tensile-Tear Strength | N | ≥400 | too low |
| | | Normalized Strain Energy | kN/m | ≥5.5 at 23° C. +/− 2° C. | 2 day cure |
| | | Weathering Resistance | no units | no deterioration | UV stable |
| | | Elongation Recovery | % | ≥90 average | flex too low |
| | | Heat Aging | years | no evidence of cracking | stable |
| | | Chemical Resistance | no units | no obvious break-up | water light solvent very stable |
| | | Tensile Retention | % | ≤70 average | ok |
| | | Wet Freeze-Thaw Resistance | no units | no deleterious effects | ok |
| | | Water Vapor Permeance | ng/Pa * s * m2 | report value | minimal |
| | | Pin Holing | no units | no more than one pinhole | water permeable |
| TOTAL: | 100 | Loss of Volatile (V.O.C) | % | report value | no VOC epoxy or crumb |

TABLE 7

| Components | % | Characteristic Property | Units | Requirements (for a pass) | Observation |
|---|---|---|---|---|---|
| Hardener (epoxy) | 15 | Dimensional Stability | % | ≤5 | minimal water absorption |
| DGEBA resin | 15 | Water Absorption | % | ≤3 | water absorption low |
| 10-20 crumb | 40 | Adhesion-in-Peel | N/m | ≥175 | good adhesion |
| buffings (fine crumb) | 10 | Crack Bridging | no units | no evidence of cracking | high elongation - good flex |
| urethane | 20 | Low-Temperature Flexibility | no units | no evidence of cracking | no problems |
| EPOXY-URETHANE | | Sag-Flow Characteristic | no units | no sagging while wet | stable |
| HYBRID | | Pot Life (Quickset - set-up time) | Hrs | no sagging | set above 4 hrs |
| 50/50 | | Static Puncture | N | 4 out of 5 samples ≥150 | ok |
| | | Dynamic Impact | J | 20 out of 24 samples ≥9 | ok |
| | | Water Tightness | no units | no evidence of leaking | good |
| | | Abrasion Resistance | mg | ≤400 | very good |
| | | Tensile-Tear Strength | N | ≥400 | no tear |
| | | Normalized Strain Energy | kN/m | ≥5.5 at 23° C. +/− 2° C. | 2 day cure |
| | | Weathering Resistance | no units | no deterioration | UV stable |
| | | Elongation Recovery | % | ≥90 average | flex good |
| | | Heat Aging | years | no evidence of cracking | stable |
| | | Chemical Resistance | no units | no obvious break-up | water stable |
| | | Tensile Retention | % | ≤70 average | ok |
| | | Wet Freeze-Thaw Resistance | no units | no deleterious effects | ok |
| | | Water Vapor Permeance | ng/Pa * s * m2 | report value | minimal |
| | | Pin Holing | no units | no more than one pinhole | none |
| TOTAL: | 100 | Loss of Volatile (V.O.C) | % | report value | low VOC |

TABLE 8

| Components | % | Characteristic Property | Units | Requirements (for a pass) | Observation |
|---|---|---|---|---|---|
| Hardener (epoxy) | 15 | Dimensional Stability | % | ≤5 | water absorption ok |
| DGEBA resin | 15 | Water Absorption | % | ≤3 | water absorption low |
| 10-20 crumb | 50 | Adhesion-in-Peel | N/m | ≥175 | adhesion good |
| buffings (fine crumb) | 10 | Crack Bridging | no units | no evidence of cracking | high elongation - good flex |
| urethane | 10 | Low-Temperature Flexibility | no units | no evidence of cracking | ok |
| EPOXY-URETHANE | | Sag-Flow Characteristic | no units | no sagging while wet | ok |
| HYBRID | | Pot Life (Quickset - set-up time) | Hrs | no sagging | set above 4 hrs |
| 60/40 | | Static Puncture | N | 4 out of 5 samples ≥150 | ok |
| | | Dynamic Impact | J | 20 out of 24 samples ≥9 | ok |
| | | Water Tightness | no units | no evidence of leaking | good |
| | | Abrasion Resistance | mg | ≤400 | very good |
| | | Tensile-Tear Strength | N | ≥400 | no tear |
| | | Normalized Strain Energy | kN/m | ≥5.5 at 23° C. +/− 2° C. | 7 day cure |
| | | Weathering Resistance | no units | no deterioration | UV stable |
| | | Elongation Recovery | % | ≥90 average | flex good |
| | | Heat Aging | years | no evidence of cracking | stable |
| | | Chemical Resistance | no units | no obvious break-up | water stable |
| | | Tensile Retention | % | ≤70 average | ok |
| | | Wet Freeze-Thaw Resistance | no units | no deleterious effects | ok |
| | | Water Vapor Permeance | ng/Pa * s * m2 | report value | minimal |
| | | Pin Holing | no units | no more than one pinhole | none |
| TOTAL: | 100 | Loss of Volatile (V.O.C) | % | report value | low VOC |

Example 5

Surface Coating Composition Using Batch Method

Epoxy resin such as Araldite GY 506® (bisphenol A modified with butyl glycidyl ether), epoxy catalyst (amine or amide catalyst) and the reclaimed tire processing product (RTPP) are transported separately to the job site.

RTPP is transferred to a mixing hopper with a blower-type pump (such as those commonly used in farming and food industry for transferring grains and seeds) until a set mass is achieved in the hopper via weighting 300-500 Lbs.

The epoxy resin and epoxy catalyst are transferred to the hopper (the binding agent is composed of a 3:1 ratio of epoxy resin to epoxy catalyst). The ratio of RTPP to binding agent is adjusted to the required composition which is from 5 to 50%.

The components added to the hopper are mixed by motorized agitation until the coating composition is homogeneous. The composition is thereafter spray applied to the surface.

A surface protective material, that is silica, is applied on top of the coating composition while it is still uncured. Alternatively, the silica is added in admixture with a separate batch of binding agent and optionally a viscosity modifier on top of the cured coating composition.

Example 6

Surface Coating Composition Using Pre-Mix Method

RTPP is mixed to proportion in 45 U.S. gallon drums with epoxy resin, in a ratio of 10-90%, depending on application. The additional agent such as viscosity modifier and foaming agents are mixed in to achieve the desired properties.

On site, the above-mentioned preparation is pumped to a mixing hopper with the epoxy catalyst in a determined ratio ranging from 4:1 to 1:1 where it is agitated until the coating composition is homogeneous. The composition is thereafter spray applied to the surface.

As for the batch method, described above, a surface protective material, that is silica, is applied on top of the coating composition while it is still uncured. Alternatively, the silica is added in admixture with a separate batch of binding agent and optionally a viscosity modifier on top of the cured coating composition.

Optionally, RTPP is mixed to the same proportions in a 45 U.S. gallon drum with the epoxy catalyst hardener and the additional agent.

When applying the surface protective material, it is possible to use various systems for applying solid (dry) material (such as silica). Alternatively, when the surface protective material is applied as admixture with a separate batch of binding agent and optionally a viscosity modifier, it is possible to use the same system as the one described for the application of the coating composition, however it is desirable to use a distinct one (or to conduct a wash cycle of the apparatus) so as to not contaminate the material during application.

Also in accordance with the present invention, there is provided an apparatus for applying a coating composition to a surface comprising: an input for delivering a recycled rubber product, one or more binding agents and optionally one or more additional agents a container associated to the input for receiving said recycled rubber product, said one or more binding agent and said one or more optional additional agent; conveying means associated to the container for conveying the coating composition from said container to said surface; and optionally, mixing means associated to the container for mixing said recycled rubber product, said one or more binding agent and said additional agent.

Figure 1:
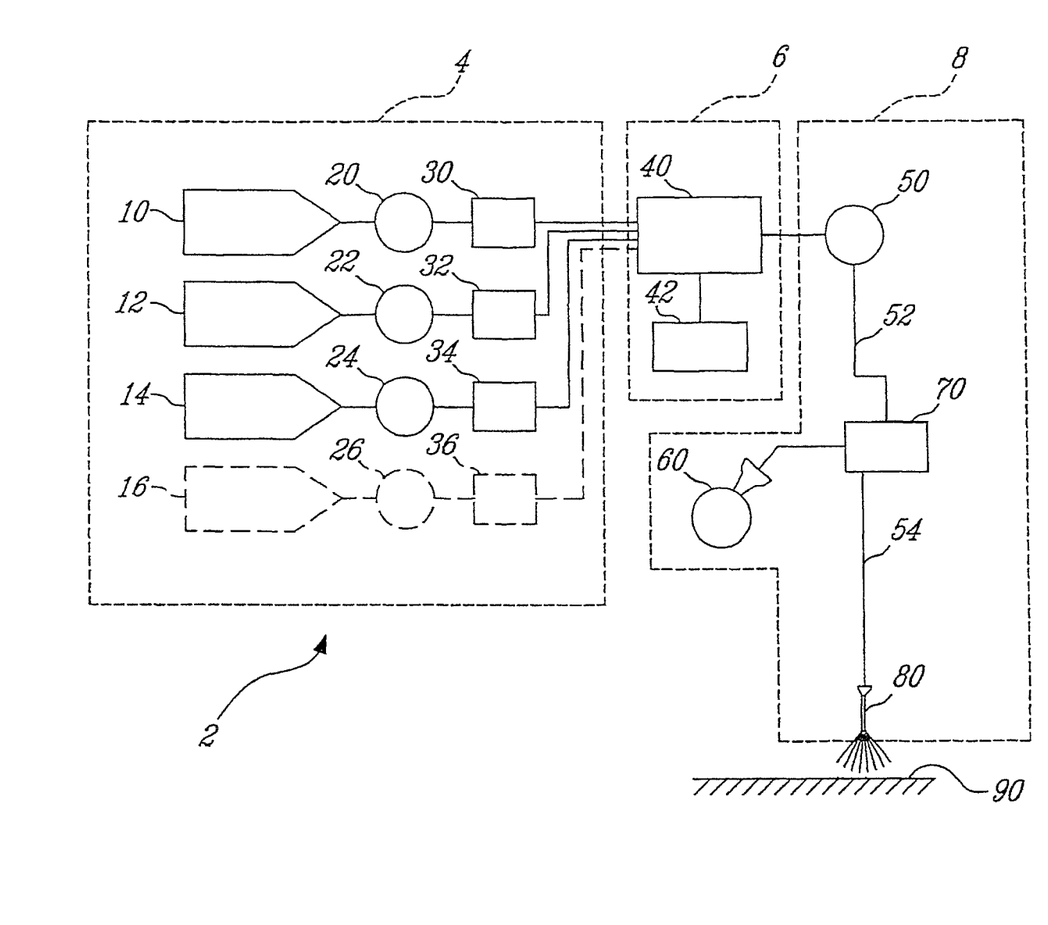
FIG. 1 is a block diagram illustrating an apparatus in accordance with one embodiment of the invention for applying a coating composition of the invention.

Now turning to FIG. 1, there is shown a schematic description of the apparatus to be used in accordance with the present invention generally shown at 2. The apparatus 2 generally has an input section 4, a container 40, a mixer 42 and a conveying section 8.

The input section 4 is provided to deliver components comprising the recycled rubber product, one or more binding agents and optionally any additional agents to the container 40 in which the components are optionally mixed by the mixer 42 until the coating composition is homogeneous.

The conveying section 8 is associated with the container 40 so as to convey the coating composition from the container 40 to the surface to be coated 90.

The various sections of the apparatus are connected by suitable lines for the flow of the components and composition between the sections.

The purpose of Input section 4 as a whole is to accurately measure given amounts of raw materials to a homogeneous mixer 42.

The input section 4 has containers 10-16 that are adapted to contain the recycled rubber product, the binding agents and the additional agents. It will readily appear to a skilled person, that when appropriate two or more containers illustrated as 10-16 may be combined to constitute one functional container.

In one embodiment, it is comprised of metering pumps for liquid delivery and conveyors for dry bulk delivery 20-26.

Pumps 20 to 26 are provided so as to permit transfer from containers 10-16 to container 40. The types of pumps suitable for use in the present invention are not especially limited. As such typically any or a combination of the following can be used: auger pump, screw pump, diaphragm pump, peristaltic pumps, air column, metering pumps, centrifugal pump and the like.

Metering pumps are available commercially and function on a variety of principles such as diaphragm, peristaltic, centrifugal, dosing, rotary, etc. Preferably, use is made of double diaphragm pumps which are air driven such as Model no. HUSKY 1590 CYCLE FLO, part no. DC3311, Series 20F06D.

Pumps 20-26 uses compressed air to move a double piston in a reciprocation motion inside the body of the pump, as the piston moves from one side to the other it creates a vacuum on one end which then fills with liquid material from the containers 10-16 while the other side empties in the mixer 42 through the exhaust line. The pumps 20-26 can deliver the required amounts of liquid raw material per stroke of the piston and by doing so can inject a specific amount of material to the mixture.

The conveyors for dry bulk are of a different design. Conveyors are used to move dry bulk from one place to another via different principles which range from belt to screw conveyors and any modification thereof. In a preferred embodiment, use is made of screw conveyors or augers for reasons of convenience in small spaces, low purchasing cost and low maintenance. In the present invention, conveyor is used to convey dry bulk rubber crumb from containers 10-16 to the homogenous mixer 42. Accordingly, a drive element (electric, pneumatic, gasoline or hydraulic motor) is attached to an auger. As the auger rotates the flighting raises the material into the tube surrounding the auger blades (or flighting). The material then exits the tube at the end of the auger and dumps the dry bulk into the mixer 42. Conveyor can deliver the desired amounts of raw material since a fairly consistent average is held and dumped with every degree of rotation of the screw.

A convenient pump for use to transfer the recycled rubber product may be a blower such as those commonly used in farming and food industry for transferring grains and seeds.

Controls 30-36 are optionally provided for measuring and controlling the amounts of the recycled rubber product, one or more binding agent and optionally any additional agents that are transferred to the container 40. The purpose of such controls 30-36 is to facilitate continuous operation with a greater degree of precision between each prepared batch. Typically, controls 30-36 comprise valves (manually or electrically controlled) and optionally Programmable logic arrays, and programmable logic controllers as well as scale, temperature sensor, metering devices. A common automation system is a PLC (programmable logic control) or a microcontroller. In a preferred embodiment, a PLC SIEMENS Model No. 6ED1052-HA00 0BA0 is used to control both analog and digital functions.

Mixer 42 provides for the mixing of raw materials from containers 10-16 into a substantially homogeneous state. A skilled person will understand that a variety of different designs would be suitable such as simple blade mixers to planetary, orbital, volumetric, continuous, gravimetric, plough shear, V, vertical screw, edge, zigzag or "Z".

In a preferred embodiment, use is made of what is known as a kneader mixer or sigma mixer such as Kneader Cum Extruder, M/c No. SM33, SR. No. SEPL33.

The mixer 42 is essentially a "U" shaped tub with stainless steel inserts and an extruder screw at the bottom for the mixer 42 material to exit. In such equipment, the raw materials enter the mixing chamber which can be regulated to a desired mixing temperature via a steel jacket. The mixer 42 is then put into forward mode and the sigma shaped blades start to rotate (they both rotate at different speeds in order to perform the kneading action). After the required amount of time has elapsed depending on mixture viscosity which affects mixing time, the mixer 42 is stopped and the direction is reversed. This allows for the sigma blades to knead and push the mixture into the extruder screw so that the mixed ingredients can be expelled without manually tilting or scooping the product out. Once the mixture is complete it is then extruded or dumped into the awaiting container 40 for delivery to the surface to be coated.

Various container 40 designs are suitable in the present invention and do not necessarily refer to pumps. The equipment is selected to meter the ingredients into the tubing 52. The driving principle here is to take the homogeneously mixed material from a mixing hopper 6 and send a specific amount of it to a tubing 52 so as not to block or clog the tubing 52 with incoming material. This operation can be conducted by for example devices such as progressive cavity pump, rotary feeder. In one embodiment of the invention, pump 50 is preferably a progressive cavity pump Type: KWA-43, Si.No-.HPP 1696 (Capacity 10 G.M.P, Head: 250, H.P: 7.5, Speed: 250)

It will be appreciated that several other methods of delivery can be used without departing from the use described. Advantageously, container 40 should allow, in addition to the handling of the catalyzed epoxy, to overcome the difficulties associated the clean-up. Once catalyzed epoxy hardens it becomes very difficult to clean. As such, the use of any kind of closed system or vessel would most likely result in "one time use" lifespan which results in increased replacement cost.

It is important to use such a device because if the output of the device into the tubing 52 is not metered it will not maintain dilute phase and the tubing 52 will simply block or explode due to over pressurizing. The mixed homogeneous material is hardly pumped up a hose due to the fact that it requires nearly 30 P.S.I/Foot of hose.

The conveying section 8 has a pump 50, tubing 52 and 54 and a dispensing unit 80.

Conveying section 8 serves as a material delivery. An advantageous feature of the apparatus in accordance is that is allows for conveying the composition of the invention from the homogeneous mixed state to the sprayable state. It was found that the most convenient method is via pneumatic conveying.

Conveying section 8 allows for taking measured amounts of the composition of the invention and entering it into a tubing 54 using a directional column of air provided by the air source 70 (such as an air compressor). The air column must be directional for several reasons; 1) the air can blow backwards into the pump 50 not allowing it to meter the correct specific amount of material into the jet stream; 2) if the air column is directional a mostly laminar flow of material is achieved which reduces "dunes" in the tubing and turbulent flow in the tubing 54 and allows for a greater certainty of dilute phase operation. Duneing is the layering of material onto the side walls of the tubing 54. that is a precursor to blocking the tubing.

Dilute phase is critical for this transfer to occur. Dilute phase operation requires that the air volume and velocity provided by the compressed air source 60 greatly exceeds that of the mixed material flow. Ensuring a certain CFM (Cubic Feet per Minute) of air volume at a variable pressure which can spike is also imperative because if the air volume movement drops or if the pressure is not maintainable then the tubing 54 could block. If it does and the air pressure is not available then the blockage will remain permanent until the pressure applied from the pump 50 is so overbearing that it will destroy the tubing 54 or disconnect it.

Pump 50 is typically any or a combination of the following: auger pump, screw pump, diaphragm pump, peristaltic pumps, air column, metering pumps, centrifugal pumps and the like, and is adapted to force the coating composition from the container 40 into tubing 52 (typically ranges from about ½" to 3"diameter). Conveniently, pump 50 is typically situated at the bottom of the container 40.

The dispensing unit 80 consists essentially of a pneumatic flow expansion device. The shape and size of such a device will change according to the surface to be coated 90. For example if coating the perimeter of a building one would not want a large elliptical spray pattern but more of a concise conical pattern so as not to overspray. The dispensing unit 80 plays used to shape a spray pattern so as to get the desired effect but also it is used to regulate the mixed materials' velocity. for If the velocity is too high the particles of rubber will bounce off the surface to be coated and liquid will fly off the particle giving them virtually no ability to adhere to the given surface to be coated. If the velocity is too low the mixed material will not fan out as it exits the tubing 54 resulting in rather unattractive piles being slowly deposited onto the surface to be coated. Preferably, the dispensing unit 80 will comprises a nozzling or "choking" apparatus at the end of tubing 54 which will ensure variability of particle exit velocity as well as spray distribution patterns.

In operation, the desired amount of recycled rubber product, one or more binding agent and optionally any additional agents in containers 10-16 are carried by pumps 20 to 26 and controls 30-36 into container 40. The components are optionally mixed by the mixer 42 until the coating composition is homogeneous.

Pump 50 forces the coating composition from the container 40 into tubing 52 at a rate ranging from approximately 0.5-15 gal./min. The coating composition is forced into another tubing 54 which is associated with a compressed air source 60 and an air source 70 (such as an open air discharge venturi) causing an air movement in tubing 54.

The coating composition is moved in tubing 54 at a given velocity and exit from a dispensing unit 80 (such as a spray nozzle) to be sprayed on the surface 90. The spray pattern can be adjusted depending on the desired effect and application through the dispensing unit 80.

Container 16, pump 26 and control 36 are shown as dotted lines to indicate the they may be optional or represent more than one container, pump and control for delivering additional components.

Container 40 and mixer 42 may be grouped as section 6, as they can optionally be two parts of single equipment. For example, 6 can conveniently be a mixing hopper.

In one embodiment, all or some of the components of the apparatus mentioned above are mounted into a mobile production facility. Accordingly, the equipment can be loaded into a dry van or trailer along with the corresponding raw materials. The trailer can then be driven from job site to job site producing the required amount of material per job catering to the contractor's needs.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

What is claimed:

1. A roof coating composition comprising:
   crumbs of size 10-20 mesh and buffings from a reclaimed tire processing product,
   a binding agent consisting of a mixture of:
     an epoxy-based binding agent and
     a polyurethane-based binding agent, and
   an amount of fibers selected from polyester, nylon, Kevlar and their mixture thereof effective to modulate tensile properties of the surface coating composition,
   wherein the roof coating composition is configured to form a composite when coated and cured on a roof, where the composite comprises:
   i) a water absorption of less than or equal to 3%;
   ii) an adhesion-in-peel value of greater than or equal to 175N/m;
   iii) a tensile-tear strength value of greater than or equal to 400N;
   iv) a normalized strain energy value of greater than or equal to 5.5 kN/m at 23° C. (+2° C.); and
   v) an average elongation recovery value of greater than or equal to 90%.

2. The roof coating composition according to claim 1, further comprising an additional agent selected from viscosity modifier, foaming agents, fire retardants, coloring agents, fungicides and their mixture thereof.

3. The roof coating composition according to claim 1, wherein 80% of the total crumbs weight is crumb rubber particles in the 1-3 mm range.

4. The roof coating composition according to claim 1, wherein the size of said buffings is above 90 mesh.

5. The roof coating composition as defined in claim 1, wherein the buffings are between 20-90 mesh size.

6. A roof coating composite resulting from the curing of the coating composition as defined in claim 1.

7. The roof coating composition as defined in claim 1, wherein the polyurethane-based binding agent is one produced from a reaction between a polyisocyanate and a polyol, wherein said polyisocyanate is diphenylmethane diisocynate (MDI), tolulene diisocynate (TDI), naphthalene diisocynate (NDI) m- and p-phenylene diisocyanate, p,p'-diphenyl diisocyanate tetra-, penta-, hexa-, hepta-, and octa-methylene diisocyanate, cyclohexylene diisocyanate, or polymethylene polyphenyl isocyanates, and mixtures thereof.

8. The roof coating composition as defined in claim 1, wherein the polyurethane-based binding agent is one produced from a reaction between diphenylmethane diisocynate (MDI) and a polyol.

9. The roof coating composition as defined in claim 8, wherein the polyol is a polyethylene glycol, a polyester polyol, glycerol or ethylene glycol.

10. The roof coating composition as defined in claim 1, wherein the epoxy-based binding agent is produced from i) a hardener and ii) diglycidyl ether of bisphenol A (DGEBA), diglycidyl ether of bisphenol B (DGEBB) or diglycidyl ether of bisphenol F or a mixture thereof.

11. The roof coating composition as defined in claim 10, wherein the epoxy-based binding agent is produced from DGEBA.

12. The roof coating composition as defined in claim 1, wherein the amount of fibers is up to 3% by weight of the surface coating composition.

* * * * *